United States Patent Office 2,762,270
Patented Sept. 11, 1956

2,762,270

PROCESS OF SIZING PAPER WITH AN AQUEOUS EMULSION OF KETENE DIMER

Gerald I. Keim, Lincoln University, Pa., and William Donald Thompson, Hockessin, Del., assignors to Hercules Powder Company, Wilmington, Del., a corporation of Delaware No Drawing. Application October 6, 1949,
Serial No. 120,002

6 Claims. (Cl. 92—40)

This invention relates in general to the preparation and manufacture of a sized paper and, in particular, to the sizing of paper with a higher organic ketene dimer.

In the sizing of paper, it is conventional to employ a physical sizing agent such as usually rosin size and, occasionally, wax, asphaltic material, or the like, such sizing agent being present in the finished product physically bonded to the surface of the fibers. Now in accordance with the present invention, a paper is sized by the chemical treatment thereof with a higher ketene, preferably in the form of the ketene dimer, the new sizing agent being used in an amount astonishingly less than that needed with rosin and rosin substitutes. The new sizing agent comprises a higher ketene in appropriate medium such as, preferably, the ketene dimer in aqueous emulsion, optionally together with a thickening agent or the like, and it is applied to the paper in the unprecedentedly small quantity of between about 0.01 and 1.0% of the active sizing agent and preferably between about 0.05 and about 0.2%. The preferred sizing agent, in general, comprises an organic ketene having a relatively large carbon configuration such as a carbon chain or configuration of at least about 6 carbon atoms and preferably at least about 10 carbon atoms, and highly satisfactory and readily available sizing compositions according to this invention are the higher alkyl ketenes, preferably in the form of their dimers and having between about 6 and about 20 carbon atoms in the ketene monomer.

The general nature and form of the invention having been set forth hereinbefore, the following examples are presented in illustration but not in limitation of the invention.

*Example 1*

A solution was prepared from 75 parts by weight of water to 1 part by weight of the sodium salt of a carboxymethyl cellulose having a carboxymethyl substitution of about 0.7 carboxymethyl group per anhydro glucose unit. This solution was placed in a Waring blendor and there was added thereto 0.3 part by weight of decyl ketene dimer dissolved in 5 parts of benzene, and the mixture was beaten for 3 minutes. The resulting primary emulsion was then diluted with water to 600 parts by volume yielding an emulsion containing 0.05% ketene dimer and about 0.16% carboxymethyl cellulose. This emulsion was characterized by being relatively stable against decomposition for a period of at least 4 weeks at 25° C., the stability being indicated by retention of its sizing properties at substantially the original level for this period of time.

Waterleaf handsheets of bleached sulfite pulp were prepared with a basis weight of 40 lbs. per ream and were wet with the emulsion by immersion therein, and the excess emulsion was removed by pressing the wet sheet on a glass plate with a hard rubber roller. The emulsion was retained in the paper in an amount of about 200% based on the dry weight of the sheet to yield a paper containing 0.1% ketene dimer based on the weight of fiber. The thus-treated handsheets were oven dried for 10 minutes at 120° C., yielding a paper highly resistant to penetration by water, ink, etc., but still characterized by a relatively easily wettable (by water) surface, as indicated by a low contact angle. The dried sheets were tested for ink penetration resistance with standard feather ink and yielded a test result of greater than 1200 seconds (85% reflectance). With ink containing 20% lactic acid, an average test result of 137 seconds was obtained.

*Example 2*

An emulsion was prepared according to the procedure of Example 1 to contain 0.1% hexadecyl ketene dimer and was characterized by stability against decomposition of the ketene dimer for at least 4 weeks at 25° C. Bleached sulfite handsheets having a basis weight of 40 lbs. per ream were prepared and tub-sized with the diluted emulsion to yield a product containing 0.2% of the ketene dimer, based on the weight of pulp. The resulting treated sheets were air dried at room temperature and, when tested immediately, showed substantially no sizing. After standing for 24 hours at room temperature, the paper showed a sizing test of 150 seconds (standard feather ink) and, after standing for 48 hours at room temperature, the sizing had increased to 1000 seconds. After 13 days at room temperature, the paper had a sizing value of greater than 12,000 seconds (standard feather ink) and a sizing value of 1400 seconds (20% lactic acid).

The ketene sizing composition according to this invention may be prepared by solution of the appropriate ketene or ketene dimer in an appropriate organic solvent such as, for example, benzene, carbon tetrachloride, or the like, or optionally, may be prepared in aqueous dispersion or emulsion, if desired, in the presence of a thickening agent. Thus, for example, a sizing agent such as a higher alkyl ketene dimer may be prepared in aqueous emulsion, and the aqueous emulsion employed as a sizing agent at any step subsequent to formation of the paper web or other product. Suitable ketenes to be employed according to the invention include hexyl ketene dimer, decyl ketene dimer, dodecyl ketene dimer, tetradecyl ketene dimer, octadecyl ketene dimer, and dimers of mixtures of ketenes which may be prepared from naturally occurring fats, oils, and the like. In addition to the dimer of a higher mono ketene, suitable ketene compounds include also monomeric, monoalkyl or monoaryl ketenes, dialkyl ketenes, diaryl ketenes, arylalkyl ketenes, and mono- and di-alicyclic ketenes and the like such as, for example, phenyl ketene, dioctyl ketene, decyl phenyl ketene, and cyclohexyl ketene and their dimers.

In the preferred embodiment of the invention, it has been found that a ketene dimer such as the dimer of a monoalkyl ketene having a carbon configuration between about 6 and about 20 carbon atoms may be prepared in aqueous emulsion and is characterized by stability against decomposition of the ketene dimer for a long period of time and yet is characterized by an ability to react with cellulosic hydroxyl groups to yield a sized paper. In this manner, a sizing composition is prepared comprising an aqueous emulsion of the ketene dimer emulsified or stabilized with a suitable emulsifying or stabilizing agent including, for example, soaps, synthetic detergents and the like, and organic thickening agents such as starch and water-soluble cellulosic derivatives, including carboxymethyl cellulose and other water-soluble cellulose ethers. This emulsion is particularly valuable as a composition for the sizing of paper inasmuch as it is readily miscible with and dilutable with water and may be employed at any time with a cellulosic paper either wet or dry and, furthermore, is particularly valuable since it may be employed in the sizing of paper without the introduction of a solvent recovery problem.

It is surprising to observe the unexpected stability of this aqueous emulsion of the ketene dimer, since in emulsion form, the ketene dimer must exhibit stability toward the aqueous hydroxyl groups and, at the same time, to be an effective agent, must exhibit reactivity toward cellulosic hydroxyl groups. The effectiveness of these emulsions containing in addition carbohydrate thickening agents such as, for example, starch, cellulose derivatives, or the like, is still more surprising inasmuch as the ketene dimer must, to be effective, exhibit reactivity toward the cellulose molecules of the paper fibers and, at the same time, to be stable, must react with neither the hydroxyl groups of the aqueous medium nor the hydroxyl groups of, for example, the cellulose ether thickening agent.

The ketene dimer emulsion or, alternatively, the ketene or ketene dimer solution prepared according to this invention, is applied to paper to impart sizing thereto by a suitable means such as, for example, as a tub size, from showers, or by various coating techniques and at any convenient place in the paper machine such as the smoothing rolls, size press, or the like. According to normal papermaking procedure, the ketene or ketene dimer is applied to paper and, during the usual papermaking procedures such as drying, calendering, and the like, will be caused to react with the cellulosic fibers to yield a sized paper. However, if desired, no drying step need be employed or the sizing agent may be applied at a time subsequent to a drying step whereupon sizing characteristics developed in the paper either upon heating or upon standing for a period of several days at room temperature.

While various sizing compositions may be prepared in accordance with this invention, it is to be observed that a preferred sizing composition comprises a dilutable aqueous emulsion containing the appropriate ketene dimer and an organic thickening agent or, alternatively, the diluted emulsion prepared therefrom. The relative proportions of ketene dimer and thickening agent may be varied as desired; however, particularly advantageous properties such as, for example, improved rattle, feel, surface strength, and the like are imparted to paper through the incorporation in the sizing composition of a significant quantity of the organic thickening agent such as starch. Inasmuch as the ketene sizing agent is employed in an amount between about 0.01 and about 1.0%, preferably between about 0.05 and about 0.2% based upon the weight of the fibers, a highly satisfactory sizing composition will contain an organic thickening agent in an amount of up to about 100 parts of the thickening agent per part of the ketene dimer.

Based on the amount of ketene or ketene dimer in the sizing composition, the amount of sizing agent required for imparting of a significant degree of sizing to paper will depend to a minor degree on the nature of pulp or paper which is to be sized although, in general, the amount of sizing material is minute compared with the amount of conventional sizing agents generally employed. In order to avoid oversizing of the paper, it is generally desired to treat the paper with less than about 1% of the ketene based on the weight of paper while, on the other hand, to impart significant sizing there may be used as little as about 0.01% of the ketene or ketene dimer. Within this broad range it is generally desired, for a good grade of sized paper, to incorporate between about 0.05 and about 0.2% of the sizing agent, based on the weight of the pulp, since the preferred sizing agents are roughly 20 to 50 times as efficient weight for weight as conventional sizing agents such as rosin size.

When the aqueous emulsion of the ketene dimer is employed to size paper according to usual papermill operations, it is desirable to prepare an extremely dilute emulsion containing generally less than about 2% of the ketene dimer and in commercial operation generally between about 0.01 and about 2.0%, preferably between about 0.1 and about 0.6% and usually about ½%, although the exact concentration of the emulsion will be varied, depending on the actual conditions of operation, to control the degree of sizing imparted to the finished product.

The sizing agents described herein permit easy preparation of a highly sized nonwater-repellent paper and, furthermore, the sizing agent is relatively independent of the nature of the pulp employed and comparable sizing results are obtained with the various types of chemical and mechanical pulps including, for example, sulfate, sulfite, and soda pulp, ground wood pulps, and the like; accordingly, it will be understood that numerous variations will be possible within the scope of this invention.

What we claim and desire to protect by Letters Patent is:

1. A process for sizing paper comprising forming a web of cellulosic fibers, impregnating said web with an aqueous emulsion having in the dispersed phase a dimer of a higher organic ketene so that from 0.01 to 1.0%, based on the weight of the fibers, of said dimer is retained on the web, said ketene having at least 6 carbon atoms and having attached to the >C=C=O group only members of the class consisting of hydrogen and hydrocarbon radicals, and reacting said dimer with the cellulose fibers whereby sizing is imparted to the paper.

2. A process for sizing paper comprising forming a web of cellulosic fibers, impregnating said web with an aqueous emulsion having in the dispersed phase a dimer of a higher alkyl ketene so that from 0.01 to 1.0%, based on the weight of the fibers, of said dimer is retained on the web, said ketene having from 6 to 20 carbon atoms and having attached to the

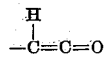

group an alkyl radical, and reacting the said dimer with the cellulose fibers whereby sizing is imparted to the paper.

3. A process for sizing paper comprising forming a web of cellulosic fibers, impregnating said web with an aqueous emulsion having in the dispersed phase a dimer of a higher alkyl ketene so that from 0.01 to 1.0%, based on the weight of the fibers, of said dimer is retained on the web, said ketene having from 6 to 20 carbon atoms and having attached to the >C=C=O group only alkyl radicals, and reacting said dimer with the cellulose fibers whereby sizing is imparted to the paper.

4. A process for sizing paper comprising forming a web of cellulosic fibers, impregnating said web with an aqueous emulsion having in the dispersed phase decyl ketene dimer so that from 0.01 to 1.0%, based on the weight of the fibers, of said dimer is retained on the web and reacting said dimer with the cellulose fibers whereby sizing is imparted to the paper.

5. A process for sizing paper comprising forming a web of cellulosic fibers, impregnating said web with an aqueous emulsion having in the dispersed phase tetradecyl ketene dimer so that from 0.01 to 1.0%, based on the weight of the fibers, of said dimer is retained on the web and reacting said dimer with the cellulose fibers whereby sizing is imparted to the paper.

6. A process for sizing paper comprising forming a web of cellulosic fibers, impregnating said web with an aqueous emulsion having in the dispersed phase hexadecyl ketene dimer so that from 0.01 to 1.0%, based on the weight of the fibers, of said dimer is retained on the web and reacting said dimer with the cellulose fibers whereby sizing is imparted to the paper.

References Cited in the file of this patent

UNITED STATES PATENTS

| | | |
|---|---|---|
| 1,816,973 | Kantorowicz | Aug. 4, 1931 |
| 1,996,707 | Nathansohn | Apr. 2, 1935 |
| 2,130,150 | Nathansohn | Sept. 13, 1938 |
| 2,238,826 | Sauer | Apr. 15, 1941 |

(Other references on following page)

UNITED STATES PATENTS

| | | |
|---|---|---|
| 2,284,896 | Hanford et al. | June 2, 1942 |
| 2,285,490 | Broderick | June 9, 1942 |
| 2,411,860 | Hentrich et al. | Dec. 3, 1946 |
| 2,482,578 | Doggett et al. | Sept. 20, 1949 |
| 2,627,477 | Downey | Feb. 3, 1953 |

FOREIGN PATENTS

| | | |
|---|---|---|
| 522,204 | Great Britain | June 12, 1940 |

OTHER REFERENCES

Adams et al.: Organic Reactions, vol. III, pages 127–132, 1946. (Copy in Scientific Library and Division 6.)

Manufacture of Pulp and Paper, vol. 4, sec. 4, page 23, 1928.